Figure 1:
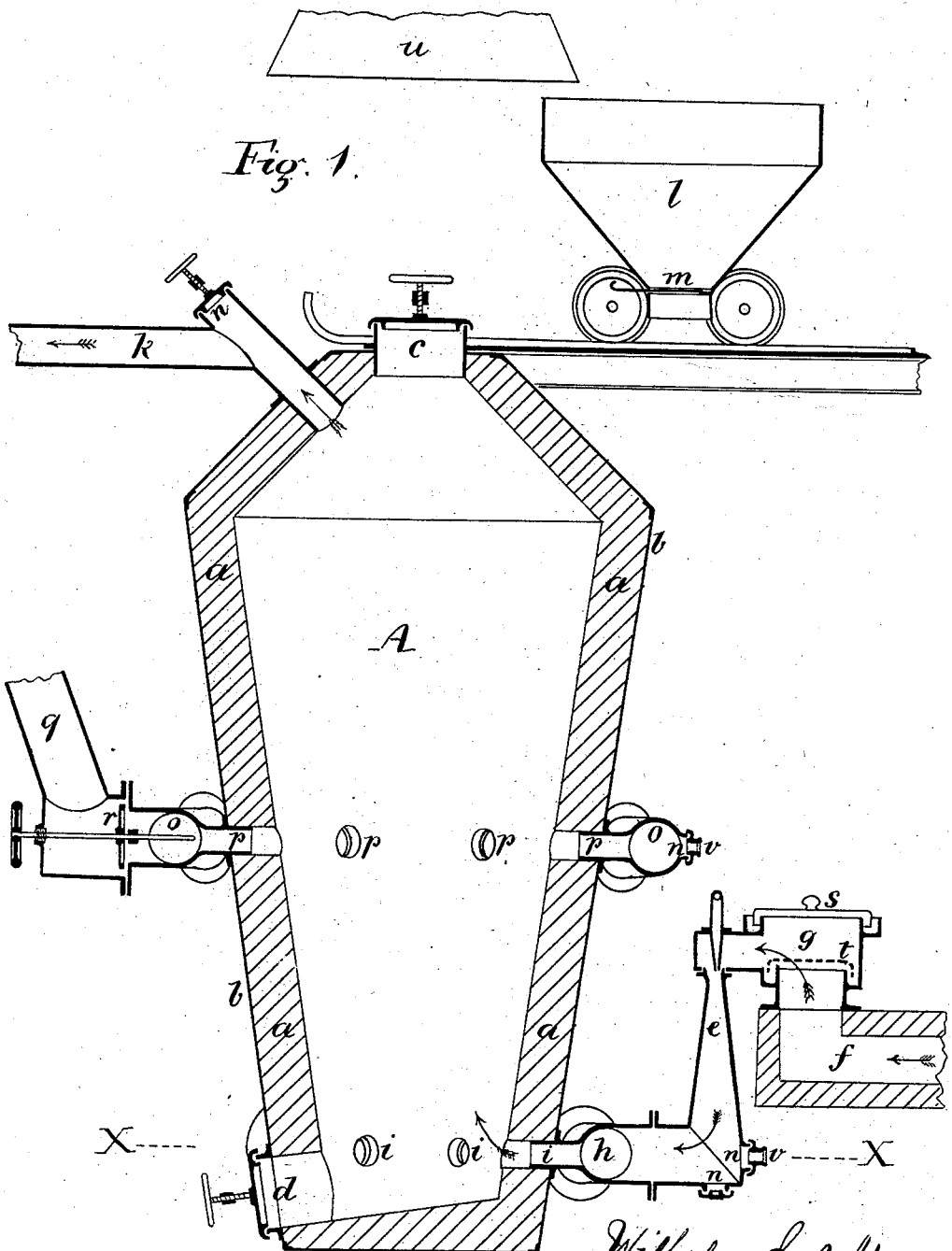

W. E. A. HARTMANN.
Manufacture of Hydrogen-Sulphide.

No. 224,426. Patented Feb. 10, 1880.

2 Sheets—Sheet 2.

W. E. A. HARTMANN.
Manufacture of Hydrogen-Sulphide.
No. 224,426. Patented Feb. 10, 1880.

UNITED STATES PATENT OFFICE.

WILHELM E. A. HARTMANN, OF TRAFALGAR TERRACE, SWANSEA, GREAT BRITAIN.

MANUFACTURE OF HYDROGEN SULPHIDE.

SPECIFICATION forming part of Letters Patent No. 224,426, dated February 10, 1880.

Application filed November 17, 1879. Patented in Great Britain, June 16, 1879.

*To all whom it may concern:*

Be it known that I, WILHELM ERDMANN ALBERT HARTMANN, of Trafalgar Terrace, Swansea, in the county of Glamorgan, Kingdom of Great Britain and Ireland, have invented new and useful Improvements in the Manufacture or Production of Sulphureted-Hydrogen Gas, of which the following is a specification.

The object of my invention is the manufacture or production of sulphureted-hydrogen gas for metallurgical and chemical purposes, where admixture with the sulphureted hydrogen of other gases, such as nitrogen, hydrogen, carbonic oxide, carbonic acid, hydrocarbon, &c., is not objectionable.

My invention is based essentially on the bringing together at a red heat of sulphurous acid or its hereinafter-mentioned substitutes with carbon and hydrogen, substantially as hereinafter described.

In making sulphureted-hydrogen gas by my improved method or process I employ sulphurous-acid gas, (which may be dilute, such as results from the calcining of iron pyrites or other sulphides, or may be produced by any other method, and may be pure,) or in lieu of sulphurous acid I employ the vapors of sulphur or the vapor of sulphuric acid, or a spray of the same, and these several substances may be employed either alone or mixed with other gases, provided the latter are not of such a nature as to decompose in the course of the process the sulphureted hydrogen formed, or interfere with its future application; and I wish it to be understood that where, in the following description, I speak of sulphurous acid I mean either that substance or, as a substitute therefor, either sulphur or sulphuric acid in the condition hereinbefore mentioned, or any mixture of these substances.

I may either apply the carbon in a solid form, as coke or charcoal or ordinary coal, and add the hydrogen in combination with oxygen, as steam, or I may apply the carbon and hydrogen combined with one another, as hydrocarbon.

Where I employ the carbon in a solid form and the hydrogen combined with oxygen I mix the sulphurous-acid gas with steam, which may be superheated or not, (the former I prefer,) and I force or draw this mixture by means of suitable apparatus, such as a gas-pump, or a fan, or a steam-blower, or a steam-exhauster, through a vessel which is air-tight, or nearly so, and which is filled with pieces of incandescent coke or charcoal, or ordinary coal, or a mixture of these. When a steam-blower is employed for forcing the sulphurous acid through the coke the steam from the blower mixes with the sulphurous acid and an additional admixture of steam is not required.

It is obvious that instead of mixing the sulphurous acid with steam a fine spray of water may be injected into it, as this water would be immediately converted into steam on coming in contact with the incandescent coke.

The mixture of gases which issues from the coke contains all, or nearly all, its sulphur in the form of sulphureted hydrogen, provided it has been passing over the coke with sufficient slowness.

The vessel which contains the coke or its substitute may be either a retort, horizontal or inclined at any angle, and fired from the outside similarly to those employed in the manufacture of coal-gas for lighting purposes, and provided at its back with an opening for the entrance of the gases, or (and this I prefer) it may be a vertical shaft of circular or other horizontal section lined with fire-brick and cased with iron, and it may be either of equal section throughout its height or of larger diameter toward the top.

The required heat I impart to the coke contents of this vessel, which I will call the "converter," by occasionally interrupting the stream of sulphurous acid and steam, and substituting therefor a blast of air or a steam-blast, whereby the coke soon acquires sufficient heat to again fit it for the decomposing of sulphurous acid.

To enable others skilled in the art to understand in what manner my invention may be advantageously carried into practical effect, I will describe, with the aid of the accompanying illustrative drawings, a suitable arrangement of converter, premising that this apparatus is not claimed as in itself novel, and that after the explanations hereinafter contained it will be evident converters differing in arrangement from the example I have selected in aid of my description may be employed without departure from the essential characteristics of my invention.

Figure 2:
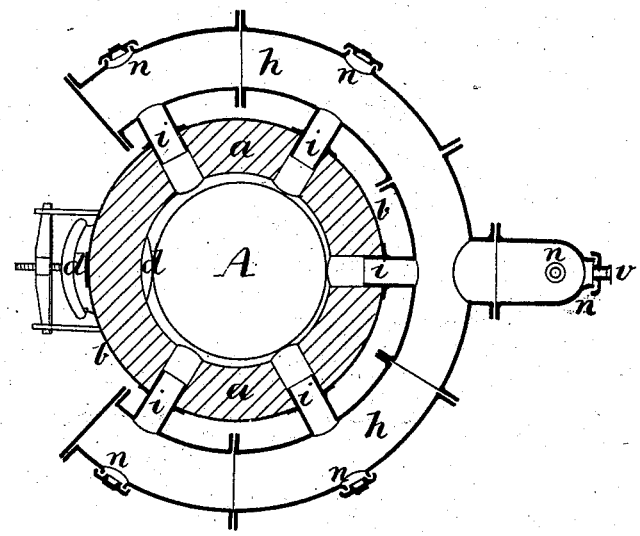

Figure 1 represents the converter in vertical section, and Fig. 2 is a horizontal section in the line X X of Fig. 1.

The same letters indicate the same parts in both figures.

The shaft A is composed of a fire-resisting brick lining, $a$, inclosed in a sheet-iron casing, $b$. This shaft is filled with coke up to about its widest part. The coke is supplied from the traveling bin $l$, which is moved over the opening $c$, when the slide $m$ is withdrawn and the coke falls into the shaft. Ashes are removed through the opening $d$. The sulphurous acid is sucked up by the steam-blower $e$ through the passage or channel $f$ and iron valve-box $g$, and is forced into the pipe $h$, which surrounds the converter, and has tuyeres $i$, through which the sulphurous acid is fed into the coke. The sulphureted hydrogen is taken away by the pipe $k$. At suitable points the apparatus is provided with hand-holes, as at $n$ $n$, for cleaning the pipes and for breaking up any clinker which may have formed in the shaft. All openings in the converter can be hermetically closed with lids, with screws, and cross-bars or bridges, like the mouth-pieces of common gas-retorts.

At about one-half the height of the shaft there is arranged a second blast pipe, $o$, with tuyeres $p$, which pipe is connected, at $q$, with a fan or other apparatus for producing a blast of air, the communication being shut off when required by the stop-valve $r$.

If the size of the shaft A be considerable, I arrange close above or below the tuyeres $i$ a grating of iron, partly to better divide both blast and gas over the whole cross-section of the coke and partly to facilitate getting out the ashes.

I commence operations by opening the mouth-piece $c$, filling the shaft with coke, and lighting at the bottom. Then I remove the cover $s$ in the valve-box $g$ and put in the cover $t$, (as shown dotted in Fig. 1,) so as to close the sulphurous-acid passage or channel $f$ and admit air to the steam-blower. I now turn on the steam-blast, which forces air through the coke and soon fires it. When the fire has reached the tuyeres $p$, I open the valve $r$, so as to admit air, until the flame appears at the top of $c$. The gases of combustion may be conducted away by a funnel, as at $u$. If the height of shaft be not considerable the second blast-pipe, $o$, with its valve and tuyeres, may very well be dispensed with, as it only serves to hasten the lighting of the coke by supplying the upper portion thereof with fresh air. As soon as the coke is thoroughly hot I stop the steam, close the valve $r$, and also the opening $c$, and, having removed the cover $t$ and replaced the cover $s$, I again turn on steam, which now sucks up the sulphurous acid and forces it through the incandescent coke, whereby it is converted into sulphureted hydrogen, which leaves the converter at $k$. The covers $s$ and $t$ dip with their lower edges into annular gutters filled with sand, so as to make a secure joint, as well understood.

After a time—that is, when the temperature of the coke has been lowered so much that complete decomposition of the sulphurous acid no longer takes place—I stop the steam, remove the cover $s$, put on the cover $t$, open $c$ and $r$, and admit steam to the blower, so that a blast of air is driven by the blower through the coke just at first lighting up, and after a short time—that is, when the necessary heat has been recovered by the coke—I again inject sulphurous acid, and so on alternately.

Of course the coke is gradually consumed during the process above described, and fresh coke has to be supplied through $c$ from time to time to keep the converter sufficiently charged; also, the ashes have to be withdrawn at the bottom. Sight-holes $v$ enable the temperature of the coke contents to be observed.

Where, in carrying out my invention, a retort is employed in lieu of a converter, the supply of fresh coke must be kept up and the ashes withdrawn, as in the case of the converter.

When employing carbon and hydrogen in combination I mix the sulphurous-acid gas with any liquid or gaseous hydrocarbon, such as the vapor or spray of petroleum or common lighting-gas, with or without the addition of steam, and I raise this mixture to red heat by either passing it through a tubular apparatus or system of pipes arranged in a furnace and kept red hot, or through a retort filled with pieces of brick, pumice-stone, coke, or the like, and which is kept at a red heat by an external fire; or I employ a converter, such as hereinbefore described, or any other apparatus in common use for raising the temperature of gases to a red heat.

If the sulphurous acid is partly or wholly substituted by the vapors of sulphur, I invariably add steam or a spray of water to the mixture previous to raising it to a red heat, or I drop water into the retort or vessel in which the gaseous mixture is being heated.

The proportion of the different gases must, of course, depend on the concentration and nature of the gases employed, and has to be ascertained by suitable tests in each case.

The carbon and hydrogen should be so proportioned with reference to the sulphurous acid that there is sufficient free hydrogen for union with the sulphur of the sulphurous acid, and that all the oxygen is fixed so as not to destroy the sulphureted hydrogen after it is formed.

In forming the sulphureted hydrogen by means of solid carbon and steam the temperature and depth of the carbon is sufficient to decompose the steam and sulphurous acid, and the result of this decomposition, which is a mixture of carbonic oxide and carbonic acid in varying proportions, does not affect the sulphureted hydrogen produced.

In practice the operation of the furnace can be regulated by examining the resulting products and diminishing the supply of steam and sulphurous acid or increasing the temperature of the coke, as may be required, if the desired decomposition does not take place.

Sulphureted-hydrogen gas produced according to my invention may be used either as it leaves the retort or shaft or such other apparatus as may have been employed on the conversion of the sulphurous-acid gas, or it may first be passed through a scrubber or surface-cooler, or both, so as to free it, previously to being used, from most of the vapor of water and any other impurities which it may hold suspended mechanically. Whether the one course or the other be followed will depend on the purpose for which the gas may be intended; but such purification is a thing well understood.

What I claim as my invention is—

1. A process or method of manufacturing or producing sulphureted-hydrogen gas for industrial purposes, which consists in bringing together at a red heat sulphurous acid or its hereinabove-named substitutes, carbon and hydrogen, as indicated, whereby free hydrogen is furnished by the decomposition of the steam for union with the sulphur, and the oxygen of the sulphurous acid and decomposed steam is fixed so as not to destroy the sulphureted hydrogen after it is formed, substantially as hereinabove set forth.

2. The hereinabove-described process or method of manufacturing or producing sulphureted-hydrogen gas for industrial purposes, which consists in bringing together at a red heat, in a converter or equivalent apparatus, sulphurous acid, or its hereinabove-named substitutes, carbon in a solid form and steam, substantially as set forth.

W. E. A. HARTMANN.

Witnesses:
 WM. COX,
  *Solicitor, Swansea.*
 F. HOPKINS.
  *Clerk to Wm. Cox, Swansea.*